(12) United States Patent
Glow (10) Patent No.: US 11,347,202 B2
(45) Date of Patent: May 31, 2022

(54) MULTIPLE SINGLE AXIS SERVO DRIVES WITH A DEDICATED INTER-DRIVE NETWORK

(71) Applicant: Analogic Corporation, Peabody, MA (US)

(72) Inventor: Stephen Glow, Sterling, MA (US)

(73) Assignee: Analogic Corporation, Peabody, MA (US)

( * ) Notice: Subject to any disclaimer, the term of this patent is extended or adjusted under 35 U.S.C. 154(b) by 0 days.

(21) Appl. No.: 16/011,817

(22) Filed: Jun. 19, 2018

(65) Prior Publication Data
US 2019/0384260 A1 Dec. 19, 2019

(51) Int. Cl.
*G05B 19/414* (2006.01)
*G05B 19/4155* (2006.01)
*G05B 19/418* (2006.01)

(52) U.S. Cl.
CPC ..... *G05B 19/4141* (2013.01); *G05B 19/4155* (2013.01); *G05B 19/4185* (2013.01)

(58) Field of Classification Search
CPC ............ G05B 19/4141; G05B 19/4155; G05B 19/4185
See application file for complete search history.

(56) References Cited

U.S. PATENT DOCUMENTS

| | | | | |
|---|---|---|---|---|
| 6,496,516 | B1 * | 12/2002 | Dabecki | H04L 12/42 370/406 |
| 7,392,446 | B1 * | 6/2008 | Simmons | G01R 31/31713 326/16 |
| 10,020,012 | B1 * | 7/2018 | Weyer | G06F 13/42 |
| 2005/0201408 | A1 | 9/2005 | Otani et al. | |
| 2006/0100723 | A1 * | 5/2006 | Sun | G05B 19/4141 700/61 |
| 2010/0185325 | A1 | 7/2010 | Kwon | |
| 2013/0294260 | A1 * | 11/2013 | Do | H04M 7/006 370/250 |
| 2014/0152096 | A1 | 6/2014 | Nagatsuka | |
| 2017/0222829 | A1 * | 8/2017 | Kessler | H04L 12/40039 |
| 2018/0109207 | A1 * | 4/2018 | Oka | H02P 5/00 |

OTHER PUBLICATIONS

European Extended Search Report and Opinion for European Application No. 19181283.3, dated Nov. 21, 2019, 9 pages.
European Communication pursuant to Article 94(3) EPC for European Application No. 19181283.3, dated Sep. 17, 2021, 5 pages.

* cited by examiner

*Primary Examiner* — Thomas C Lee
*Assistant Examiner* — Anzuman Sharmin
(74) *Attorney, Agent, or Firm* — TraskBritt (57) ABSTRACT

A servo control module for a motion control system with a plurality of individual servo control modules. The servo control module includes a single axis servo drive. The servo control module further includes a set of input pins configured to receive motor state information of motors controlled by single axis servo drives of all of the other of the plurality of servo control modules over a dedicated inter-drive network each servo update cycle. The servo control module further includes a set of output pins configured to transmit the motor state information of a motor controlled by the single axis servo drive and the received state information over the inter-drive network of motors each servo update cycle.

15 Claims, 5 Drawing Sheets

MULTIPLE SINGLE AXIS SERVO DRIVES WITH A DEDICATED INTER-DRIVE NETWORK

TECHNICAL FIELD

The following generally relates to motion control and more particularly to a motion control system with multiple single axis servo drives and a dedicated inter-drive network for communication therebetween.

BACKGROUND

A motion control system includes a device that controls a motion(s) of a machine(s) through open or closed loop control. With open loop control, a controller sends a control signal to the machine and does not know whether the desired motion is ever achieved by the machine. With closed loop control (also referred to as servo), the controller additionally receives a feedback signal about the actual motion (position, velocity, position error, etc.) achieved by the machine in response to the control signal and uses the feedback signal with subsequent control of the machine to compensate for a difference between the desired and the actual motion.

A robot is a computer-controlled machine configured to carry out one or more actions. For this, the robot may include multiple motors and a single multi-axis servo drive configured to control all of the motors. Where the motors are used in combination to control an action, a state of one motor may have an effect on a state of another motor. In this case, higher precision motion can be achieved if the control algorithm used to control each of the motors utilizes the state of all the motors and not just the state of the motor being controlled. An example of such a single multi-axis servo drive is the BE2, a product of Copley Controls Corporation, which is headquartered in Canton, Mass., USA.

Where multiple individual single axis servo drives are respectively used to control the individual motors (i.e., a first servo drive controls the first motor, a second servo drive controls the second different, etc.), the control algorithm of any one of the servo drives controls its corresponding motor using only the state of that motor. In this instance, a master controller has been used to monitor the states of all the motors, perform the calculations for all of the motors with the states, and transmit the results to each of the single axis servo drives, which then drive their respective motors. Unfortunately, this increases the processing demands on the microprocessor of the master controller. In general, the master controller would not only have to performs all its functions, but also the monitoring, calculating and transmitting, all of which would have to be completed within a servo update cycle of the single axis servo drives to be effective.

SUMMARY

Aspects of the application address the above matters, and others.

The following describes a motion control module with a plurality of servo drives and an inter-drive network. In one instance, the servo drives are configured to share state information with each other over the inter-drive network, and at least one of the servo drives is configured to control a motor based not only on the state of the motor being controlled by the servo drive but also on the state of the other motors being controlled by the other servo drives.

In one aspect, a servo control module for a motion control system with a plurality of individual servo control modules. The servo control module includes a single axis servo drive. The servo control module further includes a set of input pins configured to receive motor state information of motors controlled by single axis servo drives of all of the other of the plurality of servo control modules over a dedicated inter-drive network each servo update cycle. The servo control module further includes a set of output pins configured to transmit the motor state information of a motor controlled by the single axis servo drive and the received state information over the inter-drive network of motors each servo update cycle.

In another aspect, a motion control system includes a dedicated inter-drive network, and a plurality of single axis servo drives in electrical communication with each other through the inter-drive network and including first through Nth single axis servo drives. Each of the single axis servo drives is configured to transmit state information of a motor controlled thereby to all of the other single axis servo drives over the inter-drive network. Each of the single axis servo drives is configured to generate a control signal for the motor controlled thereby based on the state information of all of the servo drives and transmit the control signal to the motor, which causes the motor to perform a motion.

In another aspect, a method includes transmitting, by a first servo drive of a plurality of single axis servo drives, a first transmit signal including a state of a first motor controlled by the first servo drive and a unique identification of the first servo drive, to a next servo drive of the plurality of servo drives over a dedicated inter-drive network. The method further includes, concurrently with the transmitting, receiving by the first servo drive a first receive signal including a state of a last motor controlled by a last servo drive of the plurality of single axis servo drives and a unique identification of the last servo drive, from the last servo drive over the dedicated inter-drive network.

Those skilled in the art will recognize still other aspects of the present application upon reading and understanding the attached description.

BRIEF DESCRIPTION OF THE DRAWINGS

The application is illustrated by way of example and not limited by the figures of the accompanying drawings, in which like references indicate similar elements and in which.

DETAILED DESCRIPTION

Figure 1:
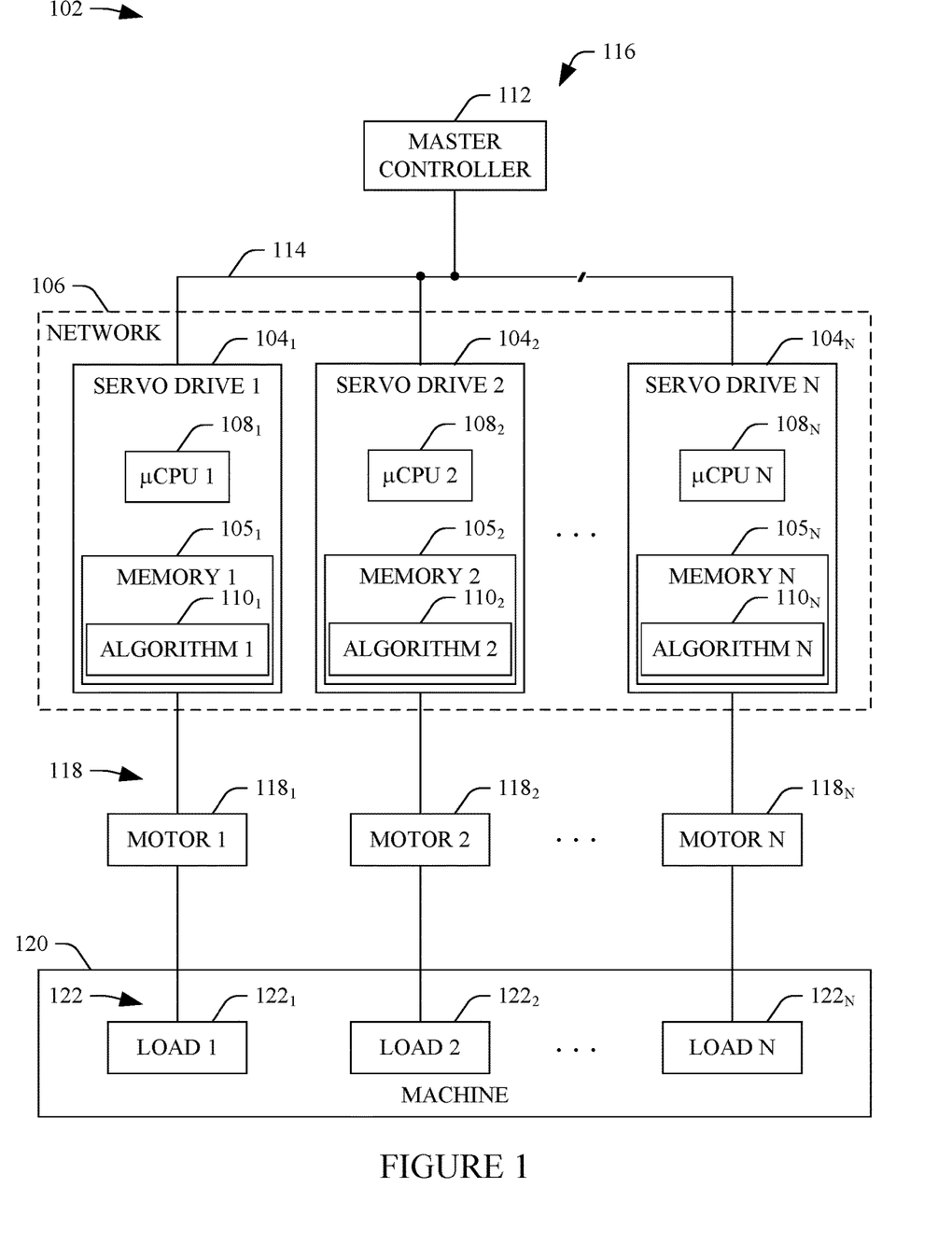
FIG. 1 shows an example servomechanism with a motion control system with multiple single axis servo drives and a dedicated inter-drive network for communication therebetween, in accordance with an embodiment(s) herein.

FIG. 1 schematically illustrates an example servomechanism system 102. The servomechanism system 102 includes a plurality of single axis servo drives, including a servo drive 1 $104_1$, a servo drive 2 $104_2$, ..., a servo drive N $104_N$ (collectively referred to as servo drives 104), where N is a positive integer, and an inter-drive network 106 in electrical communication with the servo drives 104. Each of the servo drives 104 is separate and distinct entity configured to control a single axis and is not a sub-part of a single multi-axis servo drive configured to control multiple axes. In another embodiment, the servomechanism system 102 additionally includes at least one multi-axis servo drive.

Each of the servo drives 104 includes at least a memory and a microprocessor, including a memory 1 $105_1$, a memory 2 $105_2$, ..., a memory N $105_N$ (collectively referred to as memories 105) and a processor 1 $108_1$, a processor 2 $108_2$, ..., a processor N $108_N$ (collectively referred to as processors 108). The processors 108 can be central processing units (CPU's), microprocessors (μCPU's), Feld Programmable Gate Arrays (FPGAs), or the like. Each of the memories 105 includes at least a single axis motion control algorithm, including an algorithm 1 $110_1$, an algorithm 2 $110_2$, ..., an algorithm N $110_N$ (collectively referred to as algorithms 110). Each of the algorithms 110 is configured to control an axis based on states of one or more of the servo drives 104. An example of a suitable algorithm is the multi-axis algorithm of the BE2.

The inter-drive network 106 is a dedicated network for the servo drives 104 in that the inter-drive network 106 is used only for communication between the servo drives 104. As described in greater detail below, in one instance the servo drives 104 transmit state information over the inter-drive network 106 amongst each other such that each of the servo drives 104 receives state information of all of the servo drives 104 and then determines a control signal based thereon and transmits the control signal. This is all achieved within a servo update (control) cycle, which is a predetermined frequency in which all of the servo drives 104 transmit control signals.

In one instance, the predetermined frequency is a frequency from 1,000 Hertz (1 kHz) to 20 k Hz. For example, in one instance the predetermined frequency is set to 4 kHz. This can be achieved through a static or programmable parameter. In another instance, the predetermined frequency is set to 3 kHz, 4.5 kHz or another predetermined value from 1 kHz to 20 kHz of interest. As such, the inter-drive network 106 mitigates having to use another controller (e.g., a master controller) to coordinate control by the individual servo drives 104 by allowing the individual servo drives 104 to coordinate with each other, independent of another controller, and mitigates the processing burden placed on the other controller to perform the calculations within the servo update cycle.

The servomechanism system 102 further includes a master controller 112. The master controller 112 is in electrical communication with the servo drives 104 via a network 114. The network 114 can be based on a proprietary and/or other communication protocol such as CANopen over Ethernet for Control Automation Technology (EtherCAT), Ethernet Powerlink, etc. The master controller 112 can be used to directly or indirectly (e.g., through a servo drive) provision the servo drives 104 and/or otherwise communicate with each of the servo drives 104. The combination of the master controller 112 and the servo drives 104 provide a motion control system 116.

The servomechanism system 102 further includes a plurality of motors, including a motor 1 $118_1$, a motor 2 $118_2$, ..., and a motor N $118_N$ (collectively referred to as motors 118). The servomechanism system 102 further includes a machine 120 (e.g., a robot, etc.) with a plurality of mechanical loads, including a load 1 $122_1$, a load 2 $122_2$, ..., and a load N $122_N$ (collectively referred to as loads 122). The servo drive 1 $104_1$ controls the motor 1 $118_1$ which drives the load 1 $122_1$, the servo drive 1 $104_2$ controls the motor 1 $118_2$ which drives the load 1 $122_2$, ..., the servo drive 1 $104_N$ controls the motor 1 $118_N$ which drives the load 1 $122_N$, to control motion of the machine 120.

Figure 2:
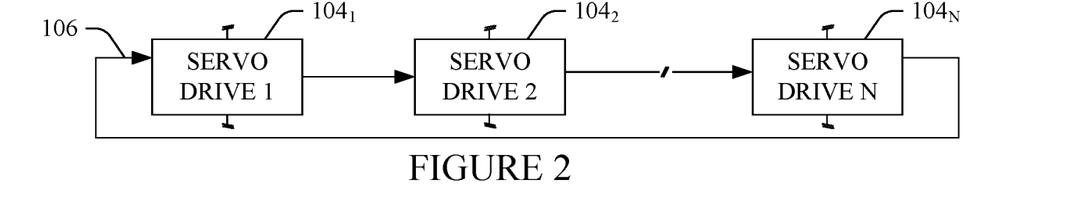
FIG. 2 schematically illustrates an example of the dedicated inter-drive network, in accordance with an embodiment(s) herein.

FIG. 2 schematically illustrates an example of the inter drive network 106 in connection with the servo drives 104.

In this example, the servo drives 104 are daisy-chained together in sequence. For example, the output of servo drive 1 $104_1$ is in electrical communication with the input of servo drive 2 $104_2$, the output of servo drive 2 $104_2$ is in electrical communication with the input of servo drive 3 (not visible), ..., and the output of servo drive N−1 $104_{N-1}$ (not visible) is in electrical communication with the input of servo drive N $104_N$, and the output of servo drive N $104_N$ is in electrical communication with the input of servo drive 1. In general, this forms a closed ring, which allows information of each servo drive 104 to be passed around to all of the servo drives 104. In the illustrated embodiment, data is transmitted in only one direction (i.e. unidirectionally), e.g., from servo drive 1 to servo drive 2, ... to servo drive N. In a variation, the transmission is in a reverse direction, going from servo drive N to ..., to servo drive 2, to servo drive 1, to servo drive N.

During each servo update cycle, each of the servo drives 104 transmits N blocks of information, or messages. For example, an initial message from the servo drive 1 $104_1$ to the servo drive 2 $104_2$ would include the state information of servo drive 1 $104_1$ and any other information (if any) that needs to be shared across the network. A next message from the servo drive 1 $104_1$ to the servo drive 2 $104_2$ would include the state information of the servo drive N $104_N$ and the other information, which the servo drive 1 $104_1$ received from the servo drive N $104_N$ in a previous message. An Nth message from the servo drive 1 $104_1$ to the servo drive 2 $104_2$ would include the state information of the servo drive 2 $104_2$ and the other information, which the servo drive 1 $104_1$ received from the servo drive N $104_N$ in a previous message. This pattern is similar for the other servo drives 104.

In one instance, each of the servo drives 104 stores the state information of the other servo drive 104 in their memory 105. For example, each servo drive 104 can be configured to read the message (e.g., a header, metadata, etc.) to determine which of the servo drives 104 the state information is from and then store that state information in a location in the memory 105 for that servo drive 104. In this instance, the memory location for each servo drive 104 is written over each servo update cycle. Receiving a message with its own state information would indicate that all the state information required for determining the control signal has been received. This state information need not be saved since the servo drive already has this information. This message would invoke the processors 108 to execute the algorithms 110 to compute control signals based on the state information of all of the servo drives 104.

Figure 3:
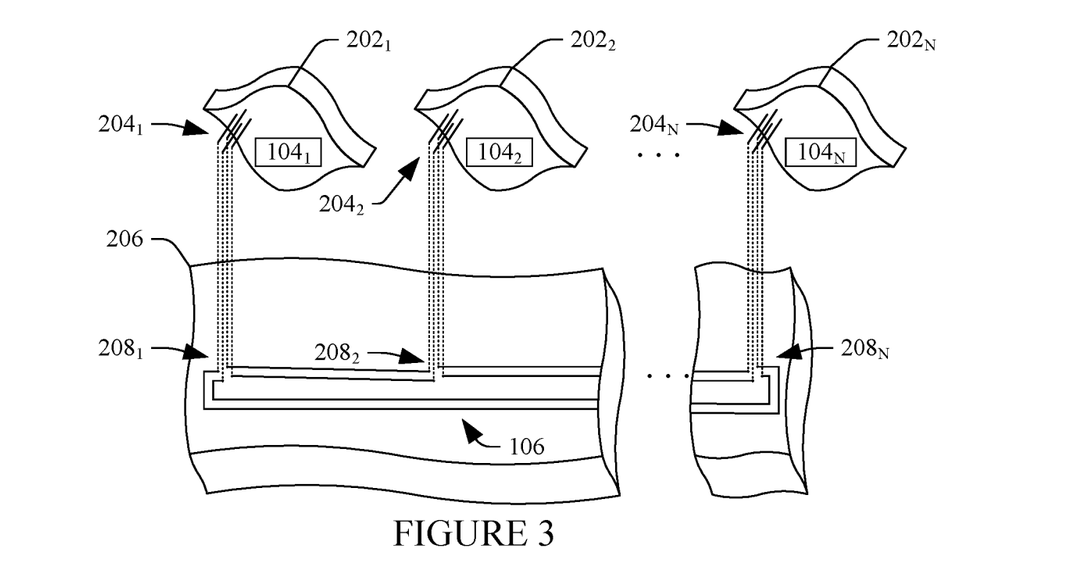
FIG. 3 schematically illustrates example connections between servo drives of servo drive modules and the dedicated inter-drive network, in accordance with an embodiment(s) herein.

FIG. 3 schematically illustrates an exploded view of an example of physical connections between the servo drives 104 and the inter-drive network 106.

In this example, each of the servo drives 104 is respectively part of a sub-portion of an individual servo control module; namely, a module 1 $202_1$, a module 2 $202_2$, ..., a module N $202_N$ (collectively referred to as modules 202). Each of the modules 202 includes a set of pins, including a set 1 $204_1$, a set 2 $204_2$, ..., a set N $204_N$ (collectively referred to as sets of pins 204). In this example, each set includes four (4) pins, including two differential pairs, where one pair is for input and the other pair is for output. Connections between the pins 204 and the servo drives 104 are not visible. For explanatory purposes and clarity, other components of the modules 202 and servo drives 104 are not shown. Each of the modules 202, in one instance, comprises a printed circuit boards (PCB) or the like.

A sub-portion of a substrate 206 includes sets of complementary sockets (complementary to the sets of pins 204), including a set 1 $208_1$, a set 2 $208_2$, ..., a set N $208_N$ (collectively referred to as sets of sockets 208). Each of the set of sockets 208 includes four (4) sockets, one pair for input pins and the other pair for output pins. The substrate 206 further includes an example of the inter-drive network 106, which electrically connects the output sockets 208 for one of the servo drives 104 to the input sockets 208 of the next consecutive servo drive 104 in the loop. In FIG. 3, dotted lines show pin/socket pair connections. The sub-portion of a substrate 206, in one instance, includes a PCB or the like.

Again, the inter-drive network 106 consists of differential pairs that transmit data in only one direction. In this example, the data is transmitted using 4B5B encoding in which groups of four (4) bits of data are mapped onto groups of five (5) bits of data for transmission; that is, 5 bits are transmitted for every 4 bits of data. This type of data encoding ensures that sufficient transitions occur on the line to allow for clock recover on the receiving side. On the receiving drive the received bits are converted back into data bytes.

Each message includes a code (e.g., a unique identifier/identification) which allows the receiving servo drive 104 to identify which servo drive 104 initiated the message. This identifier is used by the receiving servo drive 104 to determine where to store the message in the memory 105 where a dedicated memory area is reserved for each servo drive 104 on the inter-drive network 106. Additionally, the receiving servo drive 104 can identify messages that it initiated itself which have successfully passed across all the servo drives 104 on the ring. Such messages are not saved or forwarded.

Each message includes a 32-bit CRC value which the receiving servo drive 104 uses to determine if the message was transmitted without errors. Messages which have errors are marked as invalid by the receiving servo drive 104 and not used. Messages which have been received without errors, and which originated in a servo drive 104 other than the receiving servo drive 104 will be forwarded to the next servo drive 104 in the chain once the transmitter is idle.

The messages each drive transmits may also include information other than state information. For example, during system commissioning software is used to set up each servo drive 104 and tune their servo loops. This has been done using a serial interface on each of the servo drives. With the N servo drives 104 described herein, each servo drive 104 can include its own serial interface, or less than all of the servo drives can include a serial interface and the inter-drive network 106 can be utilized to forward drive setup commands to other drives on the network. This allows the commissioning software to connect to just one servo drive 104 physically and pass commands through the inter-drive network 106 to the other servo drives 104. A result is a simpler setup process for the user, and lower system costs and/or footprint due to the reduction in the separate commissioning ports on other axes.

FIG. 3 is for explanatory purpose and is not limiting. For example, the illustrated pattern and/or location of the sockets 208 and pins 204 is not limiting. Furthermore, the illustrated pattern and/or location of the inter-drive network 106 is not limiting. Furthermore, in a variation, the input and output of the modules 202 and substrate 206 is alternatively electrically and mechanically connected through solder, wire wrap, a conductive adhesive, or the like.

Figure 11:
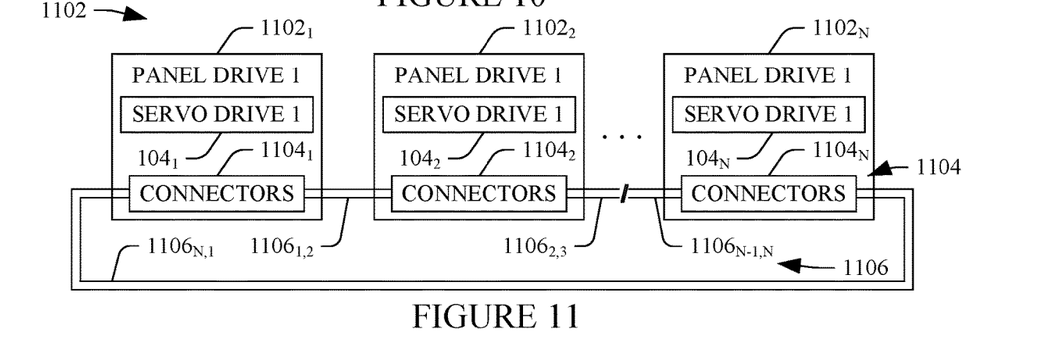
FIG. 11 schematically illustrates a variation of the configuration described in connection with FIG. 3 without the modules or the substrate.

FIG. 11 schematically illustrates a variation without the modules 202 or the substrate 206. In this variation, each of the servo drives $104_1$, $104_2$, ..., $104_N$, respectively is part of an independent and distinct panel drive $1102_1$, $1102_2$, ..., $1102_N$ (collectively referred to as panel drives 1102), each with a connector $1104_1$, $1104_2$, ..., $1014_N$ (collectively referred to as connector 1104). In this instance, the inter-drive network 106 includes cables $1106_{1,2}$, $1106_{2,3}$, ..., $1106_{N-1,N}$, and $1106_{N,1}$ (collectively referred to as cables 1106) or like, which connect the panel drives $1102_1$, $1102_2$, ..., $1102_N$ together through the connectors $1104_1$, $1104_2$, ..., $1014_N$.

Figure 4:
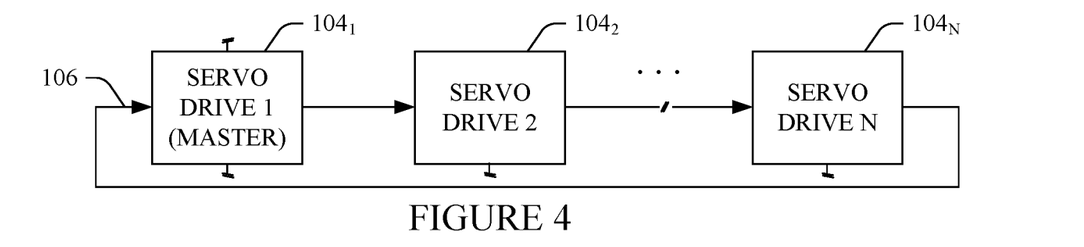
FIG. 4 schematically illustrates another example in which one of the servo drives is configured as a master controller, in accordance with an embodiment(s) herein.

FIG. 4 schematically illustrates a variation of the embodiment in FIG. 1 without the master controller 112. With this example, the servo drives 104 include a function which allows the user to upload a program to run on one of the servo drives 104 (e.g., servo drive $104_1$), and this program can control the motion on that servo drive 104. The program running on the one servo drive 104 passes commands to the other servo drives 104 through the inter-drive network 106, allowing the single servo drive 104 to act as a simple master on a multi-axis system.

Figure 5:
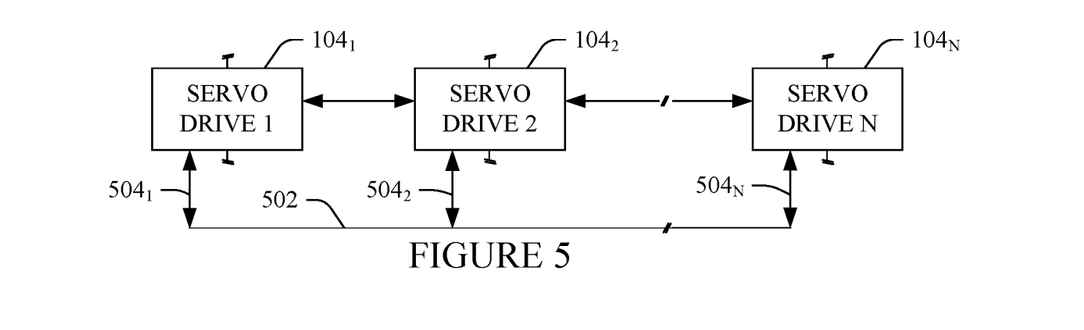
FIG. 5 schematically illustrates another example of the dedicated inter-drive network in accordance with an embodiment(s) herein.

FIG. 5 schematically illustrates a variation of the inter-drive network 106. In this variation, the inter-drive network 106 includes a bus 502, and each of the servo drives 104 includes a single bi-directional communication line, including a lines 1 $504_1$, a line 2 $504_2$, ..., a line N $504_N$ (collectively referred to as communication lines 504). The communication lines 504 from all of the servo drives 104 are connected together and share the bus 502. In one instance, this allows each of the servo drive 104 to send commands directly to all the other servo drives 104.

Figure 6:
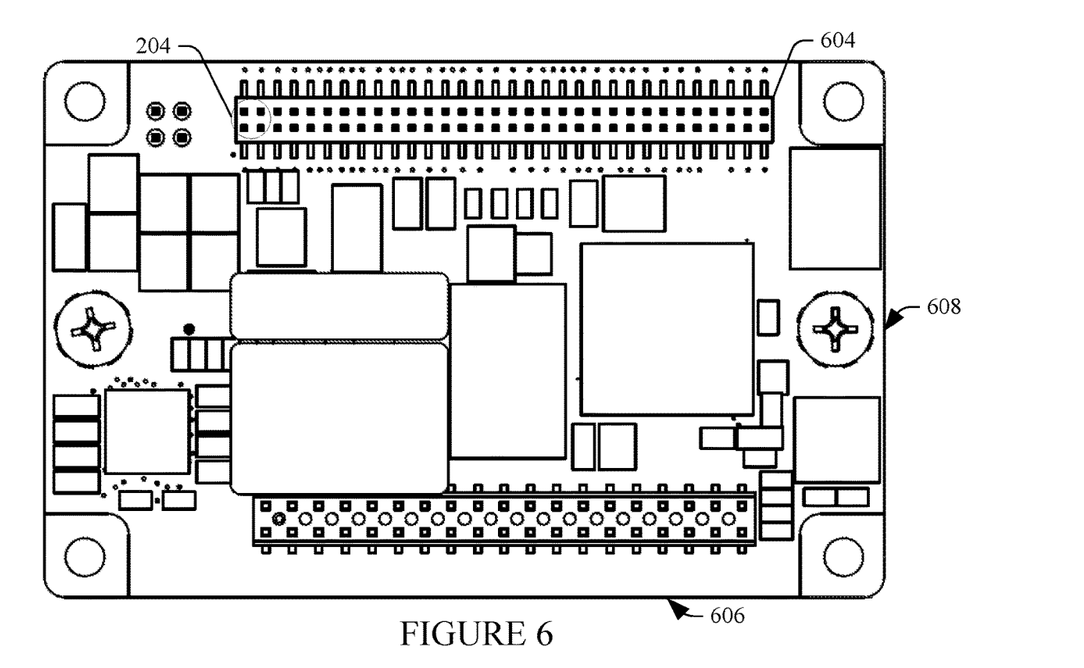
FIG. 6 schematically illustrates a top down view into a surface of the module, in accordance with an embodiment(s) herein.
Figure 7:
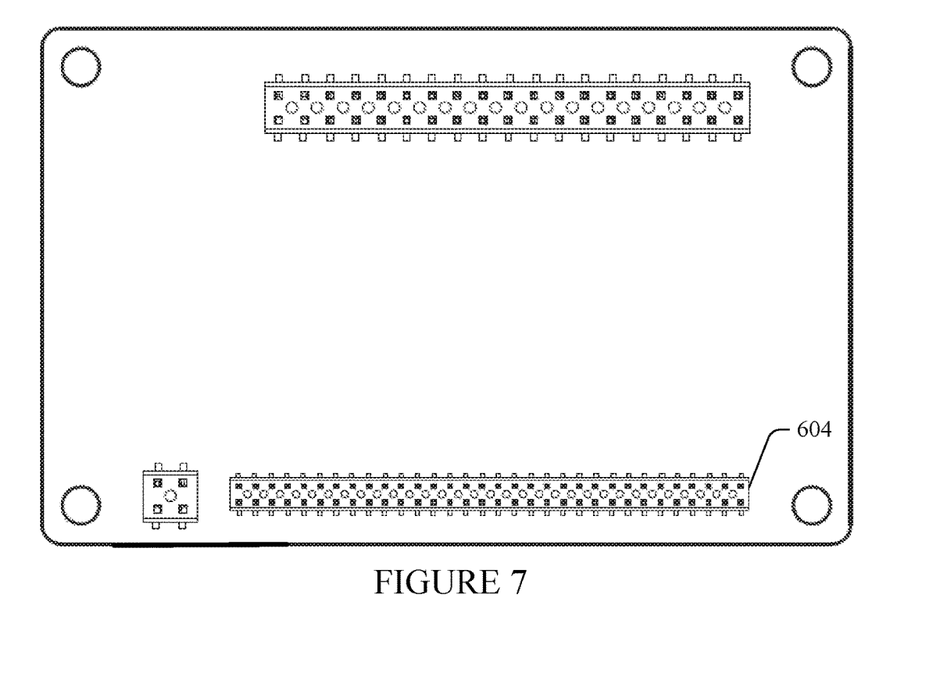
FIG. 7 schematically illustrates a top down view into an opposing surface of the module, in accordance with an embodiment(s) herein.
Figure 8:
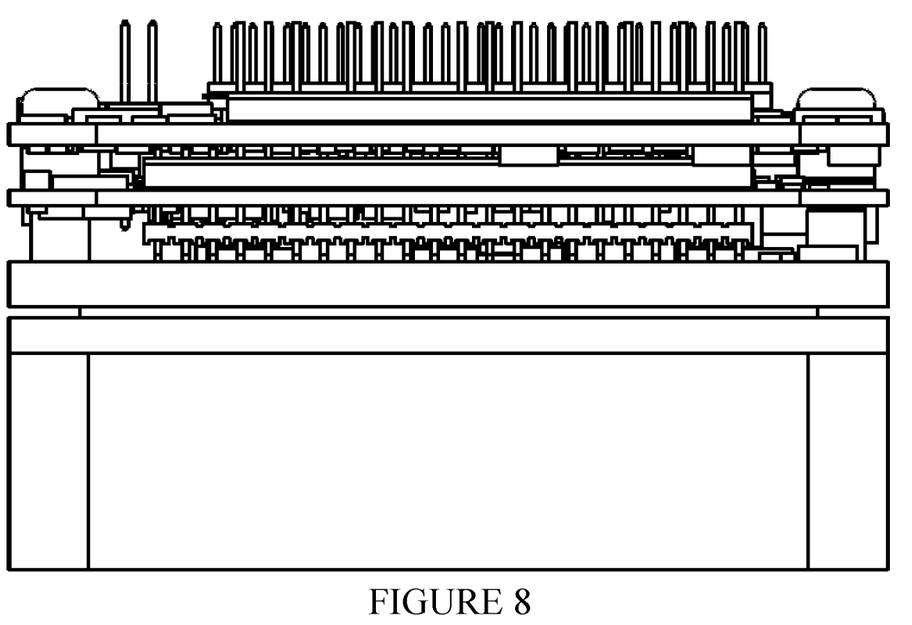
FIG. 8 schematically illustrates a view looking into a side of the module, in accordance with an embodiment(s) herein.
Figure 9:
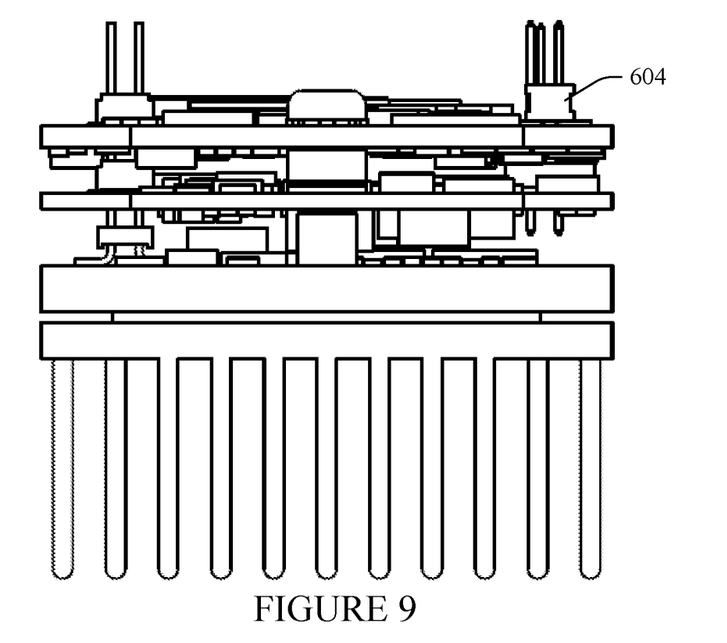
FIG. 9 schematically illustrates a view looking into another side of the module, in accordance with an embodiment(s) herein.

FIGS. 6, 7, 8 and 9 schematically illustrates an example of one of the modules 202 of FIG. 3. FIG. 6 schematically illustrates a top down view into a major surface from which the four pins 204 protrude. In this example, the four pins 204 are part of a larger group of pins of a connector 604. FIG. 7 schematically illustrates a top down view into the opposing major surface, showing a backside of the connector 604. FIG. 8 schematically illustrates a view looking into a side 606 of FIG. 6. FIG. 9 schematically illustrates a view looking into a side 608 of FIG. 6. In a variation, the four pins 204 are in their own dedicated connector and/or otherwise located on the module 202.

Figure 10:
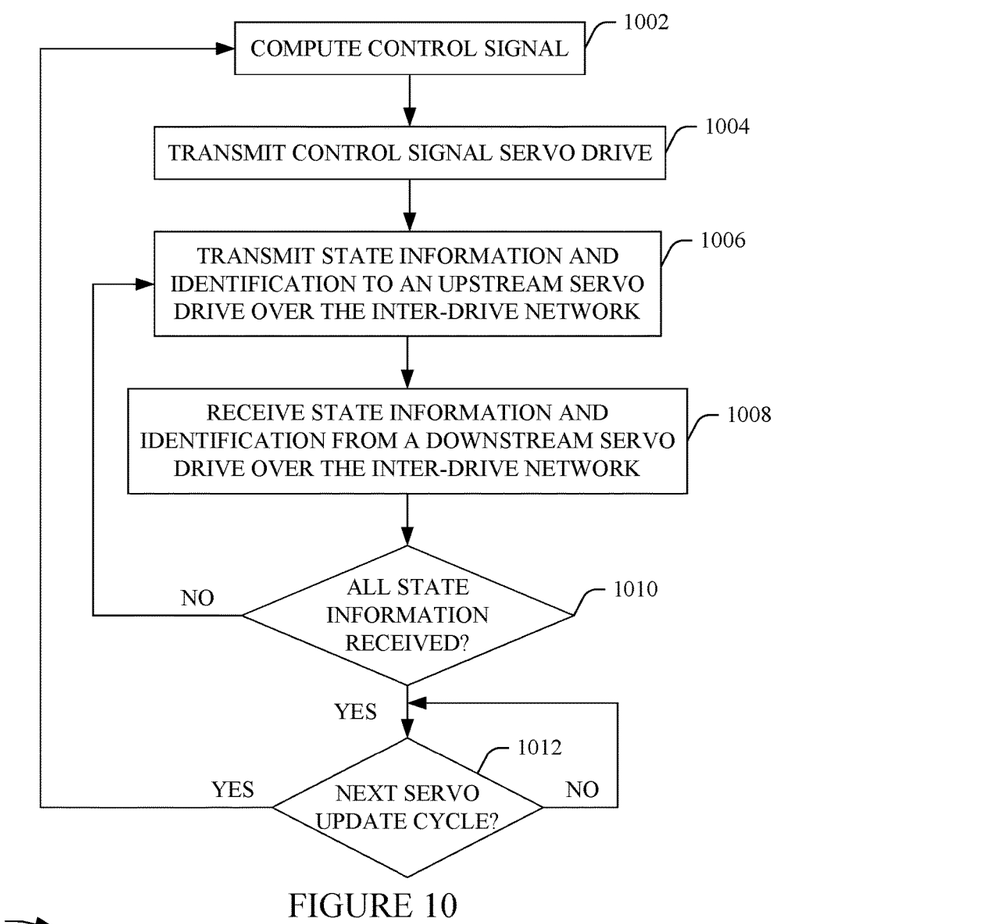
FIG. 10 illustrates an example method, in accordance with an embodiment(s) herein.

FIG. 10 illustrates an example method in accordance with an embodiment herein.

At 1002, each servo drive 104 computes a control signal for its respective motor 118 during a servo update cycle with all of the motor state information received in a previous servo update cycle.

At 1004, each servo drive 104 transmits the control signal to its respective motor 118 during the servo update cycle, where the respective motor 118 is controlled therewith to drive a load 122 of the machine 120.

At 1006, during the servo update cycle, a servo drive 104 transmits a message that includes at least motor state information and servo drive identification information to an upstream servo drive 104 over the inter-drive network 106, as described herein and/or otherwise.

At 1008, during the servo update cycle, the servo drive 104 receives a message that includes at least motor state information and servo drive identification information from a downstream servo drive 104 over the inter-drive network 106, as described herein and/or otherwise.

It is to be appreciated that acts 1006 and 1008 can be performed concurrently and/or serially.

At 1010, it is determined if each servo drive 104 received state information for all of the servo drives 104 during the servo update cycle, as described herein and/or otherwise.

If each servo drive 104 has not received state information for all of the servo drives 104 during the servo update cycle, then act 1006 is repeated, as described herein and/or otherwise.

If each servo drive 104 has received state information for all of the servo drives 104 during the servo update cycle, then at 1012, it is determined if a next servo update cycle has begun.

If a next servo update cycle has not yet begun, the servo drives 104 transition to an idle state and waits for the next servo update cycle.

If a next servo update cycle has begun, then act 1002 is repeated in the new servo update cycle with the state information received in act 1008 in the previous servo update cycle.

In a variation, acts 1002 and 1004 are performed after acts 1006 through 1010 are performed, and each servo drive 104 computes a control signal for its respective motor 118 during a servo update cycle with all of the state information received during that servo update cycle.

The application has been described with reference to various embodiments. Modifications and alterations will occur to others upon reading the application. It is intended that the invention be construed as including all such modifications and alterations, including insofar as they come within the scope of the appended claims and the equivalents thereof.

What is claimed is:

1. A servo control module for a motion control system including a number of servo control modules, the servo control module comprising:
a single axis servo drive configured to generate a motor-control signal for a motor controlled by the single axis servo drive;
a set of input pins configured to receive a first series of messages over a dedicated inter-drive network each servo update cycle, the first series of messages including first motor state information of motors controlled by single axis servo drives of all of the other of the number of servo control modules and second motor state information of the motor controlled by the single axis servo drive; and
a set of output pins configured to provide a second series of messages over the dedicated inter-drive network each servo update cycle, the second series of messages including the second motor state information and the received first motor state information of the first series of messages, wherein the single axis servo drive comprises:
a memory with at least a control algorithm; and
a processor configured to execute, responsive to receipt of the second motor state information, the control algorithm to compute the motor control signal for the motor controlled by the single axis servo drive; and
each servo update cycle, the processor configured to execute, responsive to receipt of the first motor state information and the second motor state information, to generate the motor control signal based thereon, and provide the motor control signal to the motor controlled by the single axis servo drive.

2. The servo control module of claim 1, wherein a processor configured to execute the control algorithm based on third motor state information, the third motor state information comprising motor state information of all of the single axis servo drives of all of the number of servo control modules, to generate the motor control signal for the motor controlled by the single axis servo drive.

3. The servo control module of claim 1, wherein the processor is configured to sequentially receive the first series of messages including the first motor state information and the second motor state information via the set of input pins.

4. The servo control module of claim 1, wherein the processor is configured to sequentially provide the second series of messages including the second motor state information and the first motor state information via the set of output pins.

5. The servo control module of claim 1, wherein the set of input pins includes a pair of differential input pins, and the set of output pins includes a pair of differential output pins.

6. The servo control module of claim 1, wherein the set of output pins are configured to provide the second motor state information along with a unique identification of the single axis servo drive.

7. The servo control module of claim 6, wherein the single axis servo drive is configured to store the received first motor state information in memory of the single axis servo drive according to a set of unique identifications each of the set of unique identifications uniquely identifying one of the number of servo control modules.

8. The servo control module of claim 1, wherein a servo update cycle is between one one-thousandth of a second and one twenty-thousandth of a second.

9. A motion control system, comprising:
a dedicated inter-drive network comprising:
a number of single axis servo drives in electrical communication with each other, the number of single axis servo drives including first through Nth single axis servo drives,
wherein each of the single axis servo drives is configured to provide first motor state information of a respective motor controlled thereby to one of the other single axis servo drives,
wherein each of the single axis servo drives is configured to provide second motor state information of all of the other single axis servo drives, in a series of messages, to the one of the other single axis servo drives, wherein each of the single axis servo drives is configured to:
generate a motor control signal for the respective motor controlled thereby based on the motor state information of all of the single axis servo drives and in response to receiving the first motor state information; and
provide the motor control signal to the respective motor, and wherein each of the single axis servo drives comprise a memory with at least a control algorithm and a processor, the processor configured to execute, responsive to receipt of the second motor state information, the control algorithm to compute the motor control signal for the respective motor controlled by the respective single axis servo drive, and to execute, responsive to receipt of the first motor state information and the second motor state information, to generate the motor control signal based thereon, and provide the motor control signal to the respective motor controlled by the respective single axis servo drive.

10. The motion control system of claim 9, wherein the electrical communication between neighboring single axis servo drives is unidirectional.

11. The motion control system of claim 9, wherein each of the single axis servo drives are configured to provide, along with the motor state information, a respective unique identification of the respective single axis servo drive.

12. The motion control system of claim 9, wherein one of the single axis servo drives is configured to serve as a master over the other of the single axis servo drives.

13. A method for controlling a number of single axis servos, comprising:
providing, by a first servo drive of a number of single axis servo drives, a first message including a first motor state of a first motor controlled by the first servo drive and a first unique identification of the first servo drive, to a next servo drive of the number of servo drives over a dedicated inter-drive network;
concurrently with the providing, receiving by the first servo drive a second message including a last motor state of a last motor controlled by a last servo drive of the number of single axis servo drives and a last unique identification of the last servo drive, from the last servo drive over the dedicated inter-drive network;
providing, by the first servo drive, a third message including the last motor state and the last unique identification, to the next servo drive of the number of servo drives over the dedicated inter-drive network;
concurrently with the providing of the third message, receiving by the first servo drive a fourth message including a second-to-last motor state of a second-to-last motor controlled by a second-to-last servo drive of the number of single axis servo drives and a second-to-last unique identification of the second-to-last servo drive, from the last servo drive over the dedicated inter-drive network;
in response to receiving by the first servo drive a fifth message including the first motor state information and the first unique identification from the last servo drive, invoking execution of a control algorithm by a processor to generate a motor control signal for the first motor; and
each update cycle, prior to the providing of the first message, generating, at the first servo drive, the motor control signal for the first motor based on motor state information of all of the number of single axis servo drives received in a previous servo update cycle and providing the motor control signal to the first motor.

14. The method of claim 13, further comprising:
provisioning at least one of the single axis servo drives over the dedicated inter-drive network.

15. The method of claim 13, further comprising:
controlling, by one of the single axis servo drives, the other single axis servo drives over the dedicated inter-drive network.

* * * * *